(12) United States Patent
Xie et al.

(10) Patent No.: US 11,839,816 B2
(45) Date of Patent: Dec. 12, 2023

(54) METHOD AND APPARATUS FOR CONTROLLING MOVEMENT OF VIRTUAL OBJECT, TERMINAL, AND STORAGE MEDIUM

(71) Applicant: Tencent Technology (Shenzhen) Company Limited, Shenzhen (CN)

(72) Inventors: Yafei Xie, Shenzhen (CN); Chong Huo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 321 days.

(21) Appl. No.: 17/400,033

(22) Filed: Aug. 11, 2021

(65) Prior Publication Data

US 2021/0370176 A1 Dec. 2, 2021

Related U.S. Application Data

(63) Continuation of application No. PCT/CN2020/112651, filed on Aug. 31, 2020.

(30) Foreign Application Priority Data

Sep. 5, 2019 (CN) .......................... 201910838665.2

(51) Int. Cl.
*A63F 13/497* (2014.01)
*A63F 13/56* (2014.01)
(Continued)

(52) U.S. Cl.
CPC ............ *A63F 13/56* (2014.09); *A63F 13/497* (2014.09); *A63F 13/52* (2014.09); *A63F 13/573* (2014.09); *A63F 13/803* (2014.09)

(58) Field of Classification Search
CPC ...... A63F 13/797; A63F 13/56; A63F 13/573; A63F 13/803
See application file for complete search history.

(56) References Cited

U.S. PATENT DOCUMENTS

| | | | |
|---|---|---|---|
| 9,259,652 B2 * | 2/2016 | Woodman | ............... A63F 13/67 |
| 2007/0054717 A1 * | 3/2007 | Youm | .................... A63F 13/30 |
| | | | 463/1 |

(Continued)

FOREIGN PATENT DOCUMENTS

| | | |
|---|---|---|
| CN | 103902804 A | 7/2014 |
| CN | 106823377 A | 6/2017 |

(Continued)

OTHER PUBLICATIONS

"Running Kart: Racing Against the Shadow of the First Place", Aug. 18, 2019, Retrieved from the Internet: https://v.youku.com/v_show/id_XNDMxOTM4NTc3Ng==.html?
(Continued)

*Primary Examiner* — Jay Trent Liddle
(74) *Attorney, Agent, or Firm* — Morgan, Lewis & Bockius LLP

(57) ABSTRACT

A method for controlling movement of a virtual object in a virtual environment is performed at a terminal. The method includes: obtaining first recorded trajectory information, the first recorded trajectory information being information that is recorded when a first user account of an online gaming application controls a first virtual object to race in a virtual scene and is used for drawing a movement trajectory of the first virtual object; displaying a racing battle interface, the racing battle interface being used for presenting a racing battle including a second virtual object and a third virtual object, the second virtual object being a virtual object controlled by a second user account of the online gaming application, the third virtual object being a virtual object (Continued)

controlled by a computer; and controlling movement of the third virtual object according to the first recorded trajectory information in the racing battle.

20 Claims, 7 Drawing Sheets

(51) Int. Cl.
A63F 13/52 (2014.01)
A63F 13/573 (2014.01)
A63F 13/803 (2014.01)

(56) References Cited

U.S. PATENT DOCUMENTS

| | | | | |
|---|---|---|---|---|
| 2008/0167121 A1* | 7/2008 | Maeda | ............ | A63F 13/803 463/30 |
| 2008/0167122 A1* | 7/2008 | Maeda | ............ | A63F 13/798 463/30 |
| 2013/0084969 A1* | 4/2013 | Knoles | ............ | A63F 13/798 463/29 |
| 2013/0122979 A1 | 5/2013 | Tipping et al. | | |
| 2014/0187318 A1* | 7/2014 | Gallizzi | ............ | A63F 13/355 463/31 |
| 2014/0256447 A1* | 9/2014 | Woodman | ............ | A63F 13/44 463/42 |
| 2014/0364205 A1* | 12/2014 | Obayashi | ............ | A63F 13/5375 463/31 |
| 2014/0364206 A1* | 12/2014 | Shiraiwa | ............ | A63F 13/355 463/31 |
| 2020/0306638 A1* | 10/2020 | Fear | ............ | A63F 13/67 |

FOREIGN PATENT DOCUMENTS

| | | |
|---|---|---|
| CN | 108553903 A | 9/2018 |
| CN | 108568112 A | 9/2018 |
| CN | 109358620 A | 2/2019 |
| CN | 110052027 A | 7/2019 |
| CN | 110141868 A | 8/2019 |
| CN | 110538455 A | 12/2019 |

OTHER PUBLICATIONS

Tencent Technology, ISR, PCT/CN2020/112651, dated Nov. 30, 2020, 2 pgs.
Tencent Technology, WO, PCT/CN2020/112651, Nov. 30, 2020, 5 pgs.
Tencent Technology, IPRP, PCT/CN2020/112651, Mar. 8, 2022, 6 pgs.

* cited by examiner

METHOD AND APPARATUS FOR CONTROLLING MOVEMENT OF VIRTUAL OBJECT, TERMINAL, AND STORAGE MEDIUM

CROSS-REFERENCE TO RELATED APPLICATIONS

This application is a continuation application of PCT Patent Application No. PCT/CN2020/112651, entitled "METHOD AND APPARATUS FOR CONTROLLING MOVEMENT OF VIRTUAL OBJECT, TERMINAL, AND STORAGE MEDIUM" filed on Aug. 31, 2020, which claims priority to Chinese Patent Application No. 201910838665.2, filed on Sep. 5, 2019 and entitled "METHOD AND APPARATUS FOR CONTROLLING MOVEMENT OF VIRTUAL OBJECT, TERMINAL, AND STORAGE MEDIUM", all of which are incorporated herein by reference in their entirety.

FIELD OF THE TECHNOLOGY

Embodiments of this application relate to the field of computer and Internet technologies, and in particular, to a method and an apparatus for controlling movement of a virtual object, a terminal, and a storage medium.

BACKGROUND OF THE DISCLOSURE

In a racing game application, when there are not enough matched users in a game battle, a plurality of artificial intelligence (AI) models are introduced to race with virtual objects controlled by real users. The AI model is a virtual object controlled by a computer.

In the related art, the AI model is controlled by using logic decision-making, that is, an operation of calculating the position of the AI model in real time by using logic decision-making to output the AI model, so as to control the AI model to move on a track provided in the game battle. For example, parameters such as a position, a speed, and an orientation of the AI model in a next frame are calculated in real time by using the logic decision-making according to parameters such as a position, a speed, and an orientation of the AI model in a current frame, and frame by frame, the AI is controlled to move.

However, a large amount of computing and processing overhead on a terminal is required to control the movement of an AI model by using logic decision-making, resulting in serious power consumption of the terminal. Moreover, during control of movement of an AI model by using the logic decision-making, the AI model has relatively unnatural screen presentation (e.g., AI model frequently brakes or crashes into walls). Furthermore, during control of movement of an AI model by using the logic decision-making, it is very difficult to provide AI models with different racing levels, and in particular, it is very difficult to provide an AI model with a high racing level.

SUMMARY

Embodiments of this application provide a method and an apparatus for controlling movement of a virtual object, a terminal, and a storage medium, which can be used to resolve a technical problem that a large amount of computing and processing overhead on a terminal is required to control the movement of an AI model by using logic decision-making, resulting in serious power consumption of the terminal. The technical solutions are as follows:

According to an aspect, an embodiment of this application provides a method for controlling movement of a virtual object in a virtual environment performed by a terminal, the method including:

obtaining first recorded trajectory information, the first recorded trajectory information being information that is recorded when a first user account of an online gaming application controls a first virtual object to race in a virtual scene of the virtual environment and is used for drawing a movement trajectory of the first virtual object in the virtual scene of the virtual environment;

displaying a racing battle interface, the racing battle interface being used for presenting a racing battle comprising a second virtual object and a third virtual object, the second virtual object being a virtual object controlled by a second user account of the online gaming application, the third virtual object being a virtual object controlled by a computer; and controlling movement of the third virtual object according to the first recorded trajectory information in the racing battle.

According to another aspect, an embodiment of this application provides a terminal, including a processor and a memory, the memory storing at least one instruction, at least one program, a code set, or an instruction set, the at least one instruction, the at least one program, the code set, or the instruction set being loaded and executed by the processor to implement the method for controlling movement of a virtual object in a virtual environment.

According to yet another aspect, a non-transitory computer-readable storage medium is provided, storing at least one instruction, at least one program, a code set, or an instruction set, the at least one instruction, the at least one program, the code set, or the instruction set being loaded and executed by a processor to implement the method for controlling movement of a virtual object in a virtual environment.

According to a further aspect, a computer program product is provided, the computer program product, when run on a computer, causing the computer to perform the method for controlling movement of a virtual object in a virtual environment.

According to the technical solutions provided in the embodiments of this application, recorded trajectory information is obtained, and based on the recorded trajectory information, movement control is performed on a virtual object (that is, an AI model) controlled by a computer. Because the recorded trajectory information records a movement trajectory during racing of a virtual object controlled by a real user, the AI model only needs to be controlled to move according to the movement trajectory. Compared with controlling the movement of an AI model by using logic decision-making in the related art, a large amount of computing can be reduced, so as to reduce power consumption of a terminal.

In addition, compared with the controlling the movement of an AI model by using logic decision-making in the related art, the technical solutions provided in the embodiments of this application further have the following two aspects of technical effects: First, during control of movement of an AI model by using the logic decision-making, the AI model has relatively unnatural screen presentation. For example, the AI model frequently brakes or crashes into walls. However, in this application, because the AI model moves according to a movement trajectory generated when a real user controls a virtual object to race, a screen presentation is more natural and more in line with the reality. Second, during control of movement of an AI model by using the logic decision-making, it is very difficult to provide AI models with different racing levels, and in particular, it is very difficult to provide an AI model with a high racing level. However, in this application, because movement trajectories generated when users with different racing levels race may be obtained, obviously, AI models with different racing levels can be provided. The ability to provide AI models with different racing levels also provides users with more diversified and complete adaptation experience.

BRIEF DESCRIPTION OF THE DRAWINGS

To describe the technical solutions in embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figure 1:
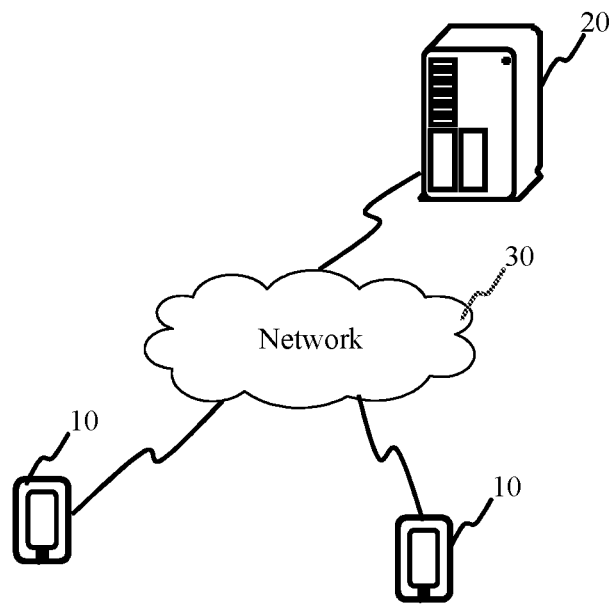
FIG. 1 is an exemplary diagram of an implementation environment according to an embodiment of this application.

To make objectives, technical solutions, and advantages of this application clearer, the following further describes in detail implementations of this application with reference to the accompanying drawings.

Before embodiments of this application are described, related terms involved in this application are explained first.

1. Virtual Scene

A virtual scene is a scene displayed (or provided) when a client of an application (such as a game application) runs on a terminal. The virtual scene is a scene created for a virtual object to perform activities (such as game competition). The virtual scene may be a simulated scene of the real world, or may be a semi-simulated semi-fictional scene, or may be an entirely fictional scene. The virtual scene may be a two-dimensional virtual scene, a 2.5-dimensional virtual scene, or a three-dimensional virtual scene, which is not limited in the embodiments of this application. A racing game application is used as an example. The virtual scene may be a virtual track. The virtual object may move on the track to race. In addition, for different racing game applications, different virtual tracks may also be provided. A specific style of the virtual track is not limited in this application.

2. Virtual Object

A virtual object is a virtual character controlled by a user account in an application. For example, the application is a game application. The virtual object is a game character controlled by the user account in the game application. The virtual object may be in a human form, or may be in an animal form, a cartoon form, a vehicle form, or another form. This is not limited in the embodiments of this application. The virtual object may be presented in a three-dimensional form or a two-dimensional form. This is not limited in the embodiments of this application. In some embodiments, when the virtual environment in which the virtual object is located is a three-dimensional virtual environment, the virtual object may be a three-dimensional model created based on three-dimensional technologies. Each virtual object has a shape and a volume in the three-dimensional virtual environment, and occupies some space in the three-dimensional virtual environment.

In the racing game application, the user account may control the virtual object to perform operations such as moving forward, braking, reversing, turning right, turning left, accelerating, drifting, flaming, using items, and changing positions of items. In addition, in the racing game application, the virtual object may be a virtual race car, a virtual character, a virtual warship, a virtual aircraft, or the like. This is not limited in this embodiment of this application.

Certainly, apart from game applications, another type of application can also present a virtual object to a user and provide a corresponding function to the virtual object, and is, for example, an augmented reality (AR) application, a social application, or an interactive entertainment application, which is not limited in the embodiments of this application. Besides, the form and corresponding function of the virtual object vary with different applications, and may be preconfigured according to an actual requirement, which is not limited in the embodiments of this application.

FIG. 1 is a schematic diagram of an implementation environment according to an embodiment of this application. The implementation environment may include a terminal 10 and a server 20.

The terminal 10 may be an electronic device such as a mobile phone, a tablet computer, a game console, an ebook reader, a multimedia player, a wearable device, and a personal computer (PC). A client of a game application, for example, a client of a racing game application, may be installed on the terminal 10.

The server 20 is configured to provide a backend service to a client of an application (for example, a game application) on the terminal 10. For example, the server 20 may be a backend server of the application (for example, the game application). The server 20 may be one server, a server cluster including a plurality of servers, or a cloud computing service center.

The terminal 10 may communicate with the server 20 through a network 30. The network 30 may be a wired network or a wireless network.

Figure 2:
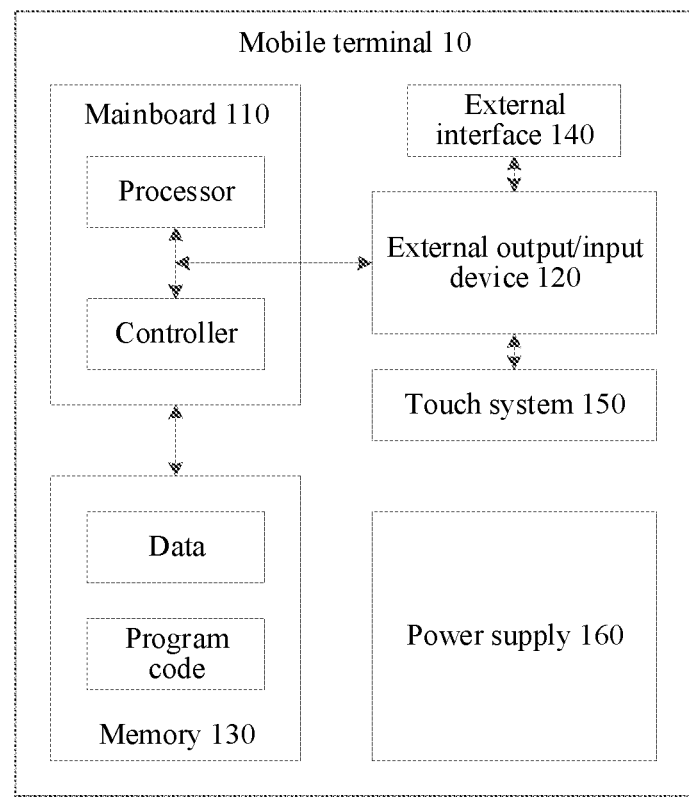
FIG. 2 is an exemplary structural diagram of a terminal according to an embodiment of this application.

Steps in the method embodiments of this application may be performed by the terminal. FIG. 2 is a schematic structural diagram of a terminal according to an embodiment of this application. The terminal 10 may include a mainboard 110, an external output/input device 120, a memory 130, an external interface 140, a touch system 150, and a power supply 160.

Processing elements such as a processor and a controller are integrated in the mainboard 110.

The external output/input device 120 may include a display component (for example, a display screen), a sound playback component (for example, a speaker), a sound collecting component (for example, a microphone), and various buttons or a keyboard, a mouse, and the like.

The memory 130 stores program code and data.

The external interface 140 may include an earphone interface, a charging interface, a data interface, and the like.

The touch system 150 may be integrated in the display component or the buttons of the external output/input device 120, and the touch system 150 is configured to detect touch operations performed by a user on the display component or the buttons.

The power supply 160 is configured to supply power to other components in the terminal 10.

In this embodiment of this application, the processor in the mainboard 110 may generate a UI (for example, a game interface) by executing or calling the program code and the data stored in the memory, and present the generated UI (for example, the game interface) by using the external output/input device 120. During presentation of the UI (for example, the game interface), a touch operation performed during interaction between the user and the UI (for example, the game interface) may be detected through the touch system 150, and a response is made to the touch operation.

Figure 3:
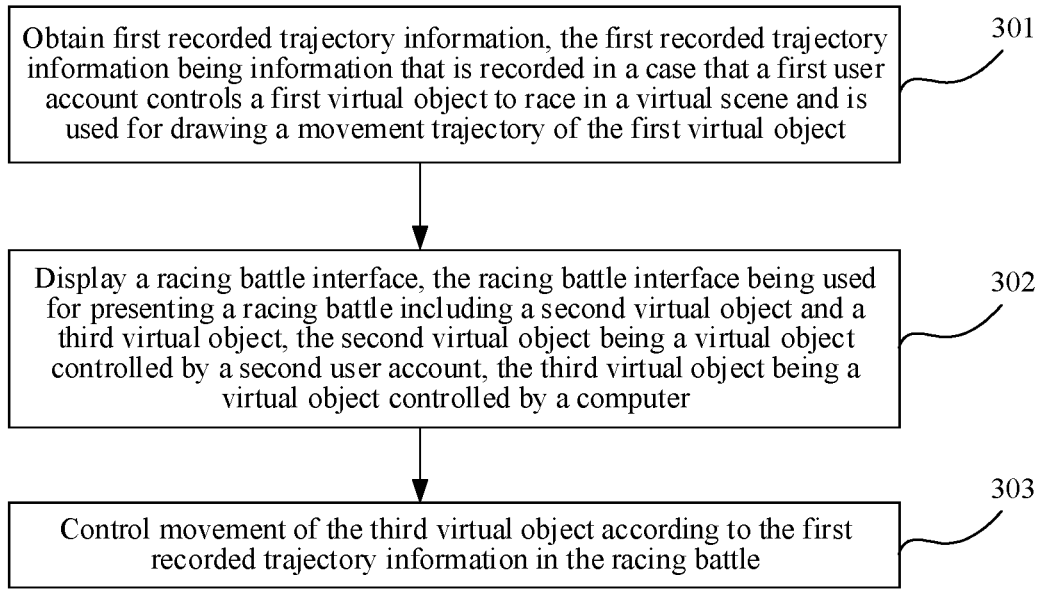
FIG. 3 is a flowchart of a method for controlling movement of a virtual object according to an embodiment of this application.

FIG. 3 is a flowchart of a method for controlling movement of a virtual object according to an embodiment of this application. The method is applicable to the terminal described above, for example, a client of an application (for example, a racing game application) on the terminal. The method may include the following steps (301 to 303):

Step 301: Obtain first recorded trajectory information, the first recorded trajectory information being information that is recorded when a first user account of an online gaming application controls a first virtual object to race in a virtual scene and is used for drawing a movement trajectory of the first virtual object.

The virtual scene has a corresponding UI. A racing game application is used as an example. The UI may be a display interface of a racing battle. The UI is configured to present a virtual scene of the racing battle to a user. For example, the UI may include an element such as a virtual track, a virtual building, a virtual item, and a virtual object in the virtual environment. In some embodiments, the UI further includes some operation controls such as buttons, sliders, and icons for the user to operate to control movement of a virtual object.

The virtual object may be in a human form or a vehicle form, an animal form, a cartoon form, or another form. For example, in the racing game application, if a racing form of the racing game application is car racing, the virtual object is presented in a virtual race car form.

In this embodiment of this application, each virtual object corresponds to a power model, and the power model is configured to control movement of the virtual object. Different virtual objects may be driven by the same power model, or may be driven by different power models. The power model has some corresponding necessary performance parameters, such as a max speed, a drift duration, and a max drift angle. When power models are different, it may be that some performance parameters in performance parameters corresponding to the power models are different. For example, max speeds are different. Alternatively, all performance parameters in the performance parameters corresponding to the power models are different. This is not limited in this embodiment of this application.

The first recorded trajectory information is information that is recorded when a first user account controls a first virtual object to race in a virtual scene and is used for drawing a movement trajectory of the first virtual object. The first recorded trajectory information may be stored in a server. A racing game application is used as an example. During racing of a virtual object controlled by a user account, a client corresponding to the user account records trajectory information of the virtual object in real time. After the racing ends, the trajectory information recorded by the client is uploaded to the server for the server to store. In some embodiments, during racing of a virtual object controlled by a user account, a client corresponding to the user account may also record a video. After the racing ends, the client uploads the recorded video to the server for the server to store. Recording a video increases processing overhead of the client while vividly reconstructing a corresponding racing battle, and excessive storage resources are occupied to store the recorded video in the server. Therefore, whether to record a video depends on an actual condition. This is not limited in this embodiment of this application.

If a user account selects a battle mode before a racing battle starts but a virtual object controlled by the user account does not have enough matched virtual objects controlled by other user accounts in the racing battle or the user account selects a player vs. computer mode before a racing battle starts, a client corresponding to the user account obtains a particular quantity of pieces of recorded trajectory information from the server. Each piece of the recorded trajectory information corresponds to one virtual object, and the recorded trajectory information may be used for drawing a movement trajectory of the virtual object in the racing battle. The battle mode is a mode in which the virtual object controlled by the user account races against virtual objects controlled by other user accounts. The player vs. computer mode is a mode in which the virtual object controlled by the user account races against virtual objects controlled by a computer.

Step 302: Display a racing battle interface, the racing battle interface being used for presenting a racing battle including a second virtual object and a third virtual object, the second virtual object being a virtual object controlled by a second user account of the online gaming application, the third virtual object being a virtual object controlled by a computer.

In addition to the second virtual object and the third virtual object, the racing battle interface may further include other virtual objects. The other virtual objects may be virtual objects controlled by other user accounts or virtual objects controlled by the computer. This is not limited in this embodiment of this application. In one implementation, a quantity of the virtual objects included in the racing battle interface is determined according to a setting of a game. For example, in a setting of a game, four virtual objects race at the same time in each racing battle. That is, the virtual object controlled by the user account races against three other virtual objects at the same time in the racing battle.

A specific racing manner of the racing battle is not limited in this embodiment of this application. For example, if a virtual object is in a human form, a racing manner of a racing battle may be that the virtual object runs on a virtual track to race, or may be that the virtual object race walks on the virtual track to race, or the virtual object slides on the virtual track to race. If a virtual object is in a race car form, a racing manner of a racing battle may be that the virtual object drives on a virtual track to race.

In this embodiment of this application, a virtual object controlled by a user account is a virtual object controlled by an owner of the user account, that is, a virtual object controlled by a real user. A virtual object controlled by the computer is a virtual object controlled by a computer program on the terminal. In some embodiments, a virtual object controlled by a computer may also be referred to as an AI virtual object or an AI model.

Step 303: Control movement of the third virtual object according to the first recorded trajectory information in the racing battle.

The first recorded trajectory information includes a movement trajectory of the first virtual object in a history racing battle, and a virtual scene corresponding to the history racing battle is consistent with a virtual scene of the racing battle. In this embodiment of this application, that virtual scenes are consistent may be that two virtual scenes are identical or may be that important display elements in two virtual scenes are the same. For example, in a racing game application, a virtual scene includes a virtual track, a virtual building, a virtual item, and the like. The virtual track is the most important display element in the virtual scene. Therefore, that the virtual scene corresponding to the history racing battle is consistent with the virtual scene of the racing battle may be that all display elements in the virtual scene of the history racing battle are the same as all display elements in the virtual scene of the racing battle, or may be that a virtual track in the virtual scene of the history racing battle is the same as a virtual track in the virtual scene of the racing battle.

The first recorded trajectory information is used for indicating the movement trajectory of the first virtual object, and the movement trajectory of the first virtual object is controlled by the first user account, that is, controlled by a real user corresponding to the first user account. Compared with a problem of unnatural performance of the third virtual object by controlling movement of the third virtual object according to the logic decision-making technology, a movement trajectory of the third virtual object in the racing battle may be similar to the movement trajectory of the first virtual object in the history racing battle by controlling movement of the third virtual object according to the first recorded trajectory information. Therefore, movement of the third virtual object controlled by the computer is more vivid and realistic.

In summary, according to the technical solutions provided in the embodiments of this application, recorded trajectory information is obtained, and based on the recorded trajectory information, movement control is performed on a virtual object (that is, an AI model) controlled by a computer. Because the recorded trajectory information records a movement trajectory during racing of a virtual object controlled by a real user, the AI model only needs to be controlled to move according to the movement trajectory. Compared with controlling the movement of an AI model by using logic decision-making in the related art, a large amount of computing can be reduced, so as to reduce power consumption of a terminal.

In addition, compared with the controlling the movement of an AI model by using logic decision-making in the related art, the technical solutions provided in the embodiments of this application further have the following two aspects of technical effects: First, during control of movement of an AI model by using the logic decision-making, the AI model has relatively unnatural screen presentation. For example, the AI model frequently brakes or crashes into walls. However, in this application, because the AI model moves according to a movement trajectory generated when a real user controls a virtual object to race, a screen presentation is more natural and more in line with the reality. Second, during control of movement of an AI model by using the logic decision-making, it is very difficult to provide AI models with different racing levels, and in particular, it is very difficult to provide an AI model with a high racing level. However, in this application, because movement trajectories generated when users with different racing levels race may be obtained, obviously, AI models with different racing levels can be provided, so as to provide users with more diversified and complete adaptation experience.

In one implementation, the first recorded trajectory information includes: n position points of the first virtual object, n being an integer greater than 1; and the controlling movement of the third virtual object according to the first recorded trajectory information includes: controlling a fourth virtual object to move according to the n position points under the drive of a power model, the fourth virtual object being a virtual object that is controlled by the computer and is invisible in the racing battle interface; determining a movement trajectory of the third virtual object according to a movement trajectory of the fourth virtual object; and controlling the third virtual object to move according to the movement trajectory of the third virtual object.

The n position points of the first virtual object are position points on the movement trajectory of the first virtual object in the history racing battle. In some embodiments, the position points are obtained through sampling in real time by a client corresponding to the first user account in the history racing battle. In some embodiments, the client obtains one position point every preset time. For example, the client obtains one position point every 0.1 s. If a duration of the history racing battle is 10 s, the client obtains 100 position points. In some embodiments, the client obtains one position point at each state changing position of the first virtual object. For example, between the $0.5^{th}$ s and the $0.7^{th}$ s of the history racing battle, the first user account controls the first virtual object to drift, and the client obtains one position point at the $0.5^{th}$ s and the $0.7^{th}$ s separately. In another example, at the $0.9^{th}$ s of the history racing battle, the first user account controls the first virtual object to accelerate, and the client obtains a position point at the $0.9^{th}$ s. During actual application, the two manners may be adopted separately to obtain a position point or may be combined to obtain a position point.

Figure 4:
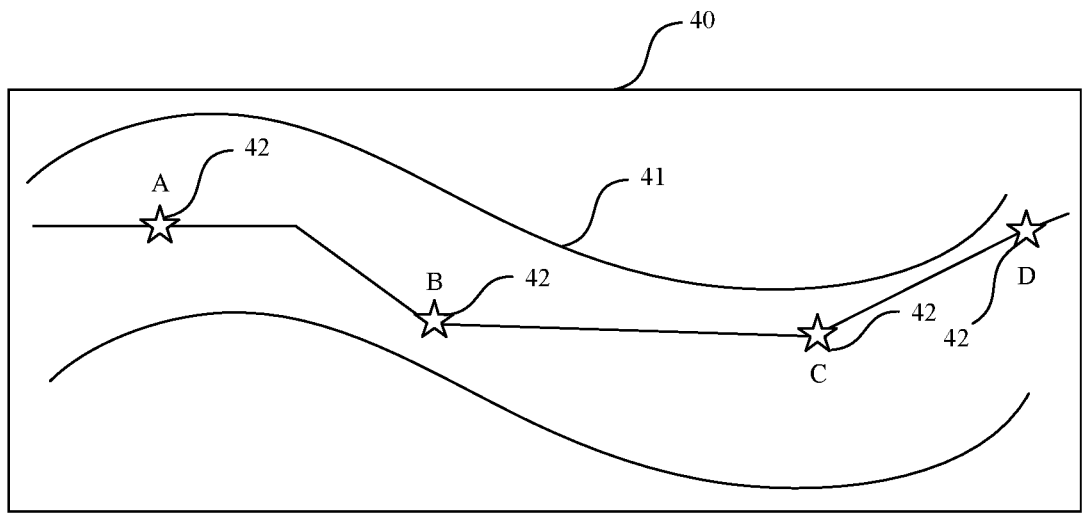
FIG. 4 is a schematic diagram of a virtual environment according to an embodiment of this application.

For example, as shown in FIG. 4, a particular section of virtual track 41 in a virtual scene 40 corresponding to a racing battle includes four position points 42, which are recorded as a position point A, a position point B, a position point C, and a position point D. The position point A and the position point D are obtained by the client in the manner of obtaining one position point every 0.1 s. The position point B and the position point C are obtained by the client in the manner of obtaining one position point at each state changing position of the first virtual object. The first virtual object drifts at the position point B, and the first virtual object accelerates at the position point C.

In this embodiment of this application, in addition to the n position points of the first virtual object, the first recorded trajectory information may further include operation information such as drifting, flaming, and resetting corresponding to the n position points, and may further include specific data such as a max speed of 12 m/s, a drifting duration of 5 s, and a max drifting angle of 60° of a power model performance parameter corresponding to the n position points. This is not limited in this embodiment of this application.

In some embodiments, to enable the movement trajectory of the third virtual object to be consistent with the movement trajectory of the fourth virtual object, a power model driving the fourth virtual object is the same as a power model driving the third virtual object. For example, to enable the movement trajectory of the fourth virtual object to be consistent with the movement trajectory of the first virtual object, the power model driving the third virtual object and the fourth virtual object is a power model driving the first virtual object.

In some embodiments, to improve vividness of the performance of the fourth virtual object and to ensure that the movement trajectory of the fourth virtual object can be corrected in time, the controlling a fourth virtual object to move according to the n position points under the drive of a power model includes: driving, for an $i^{th}$ position point in the n position points by using the power model, the fourth virtual object according to state information of the fourth virtual object at the $i^{th}$ position point to move to an $(i+1)^{th}$ position point, i being a positive integer; detecting, in a case a timestamp corresponding to the $(i+1)^{th}$ position point is reached, whether the fourth virtual object is located at the $(i+1)^{th}$ position point; and controlling, when the fourth virtual object is not located at the $(i+1)^{th}$ position point, the fourth virtual object to teleport to the $(i+1)^{th}$ position point.

Assuming that a time interval between the $i^{th}$ position point and the $(i+1)^{th}$ position point is 0.1 s, when the fourth virtual object has moved to the $i^{th}$ position point, the fourth virtual object may be controlled by using the power model driving the fourth virtual object and according to the state information at the $i^{th}$ position point to move toward the $(i+1)^{th}$ position point during the time interval of 0.1 s. If the power model driving the fourth virtual object is the same as the power model driving the first virtual object, a movement trajectory of the fourth virtual object during the time interval of 0.1 s is consistent with a movement trajectory of the first virtual object in a time period corresponding to the time interval of 0.1 s. Because there is a particular error in the computing of the client, when the time interval of 0.1 s ends, that is, when the timestamp corresponding to the $(i+1)^{th}$ position point is reached, the fourth virtual object is not necessarily located at the $(i+1)^{th}$ position point. In this case, the movement trajectory of the fourth virtual object needs to be corrected, that is, the fourth virtual object is controlled to teleport from a current position to the $(i+1)^{th}$ position point. When the fourth virtual object is located at the $(i+1)^{th}$ position point when the timestamp corresponding to the $(i+1)^{th}$ position point is reached, the movement trajectory of the fourth virtual object does not need to be corrected.

Figure 5:
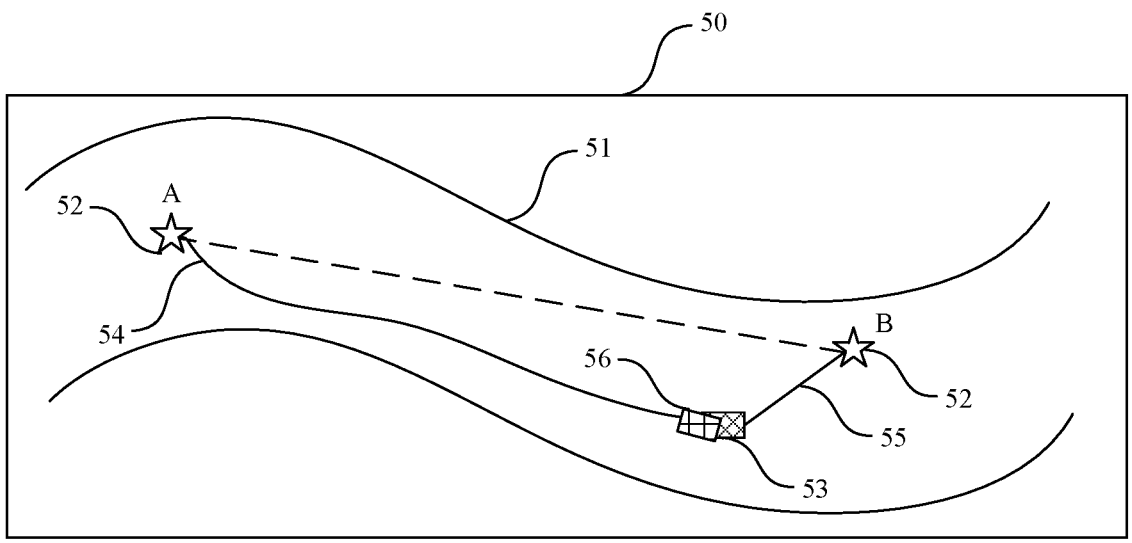
FIG. 5 is a schematic diagram of a virtual environment according to another embodiment of this application.

For example, as shown in FIG. 5, a particular section of virtual track 51 in a virtual scene 50 corresponding to a racing battle includes two position points 52, which are recorded as a position point A and a position point B. The position point A is an $i^{th}$ position point of the first virtual object, and the position point B is an $(i+1)^{th}$ position point of the first virtual object. The virtual scene 50 further includes a fourth virtual object 53, and the fourth virtual object 53 is controlled by a computer and invisible in the virtual scene 50. When the fourth virtual object 53 has moved to the position point A, state information at the position point A is obtained, and then the fourth virtual object 53 is controlled by using a power model driving the fourth virtual object 53 to move according to the state information. A movement trajectory 54 in the virtual scene 50 is a movement trajectory of the fourth virtual object 53 from the position point A to the position point B. It is assumed that a timestamp corresponding to the $(i+1)^{th}$ position point is the $0.18^{th}$ s of the racing battle. When the $0.18^{th}$ s is reached, if an end point of the movement trajectory 54 is not located at the position point B, the fourth virtual object 53 is controlled to teleport from the end point of the movement trajectory 54 to the position point B, to form a movement trajectory 55. The movement trajectory 54 and the movement trajectory 55 are combined to form a movement trajectory of the fourth virtual object 53 from the position point A to the position point B. The virtual scene 50 further includes a third virtual object 56, and a movement trajectory of the third virtual object 56 is determined according to the movement trajectory of the fourth virtual object 53.

In some embodiments, to enable the movement trajectory of the third virtual object to be consistent with the movement trajectory of the fourth virtual object and to ensure that the performance the third virtual object is more realistic and vivid, the determining a movement trajectory of the third virtual object according to a movement trajectory of the fourth virtual object includes: obtaining k position points located between an $i^{th}$ position point and an $(i+1)^{th}$ position point through sampling in a movement trajectory of the fourth virtual object from the $i^{th}$ position point to the $(i+1)^{th}$ position point, i being a positive integer, k being a positive integer; and determining a movement trajectory of the third virtual object from the $i^{th}$ position point to the $(i+1)^{th}$ position point according to the $i^{th}$ position point, the k position points, and the $(i+1)^{th}$ position point.

Figure 6:
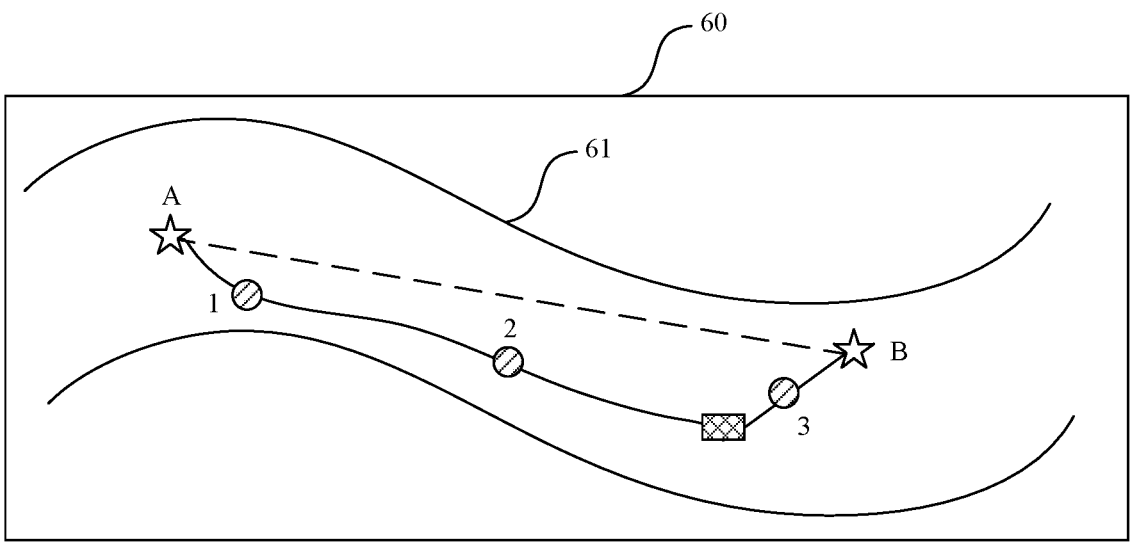
FIG. 6 is a schematic diagram of a virtual environment according to still another embodiment of this application.

In this embodiment of this application, the obtaining k position points located between an $i^{th}$ position point and an $(i+1)^{th}$ position point through sampling may be performed by using a linear interpolation technology. For example, as shown in FIG. 6, a particular section of virtual track 61 in a virtual scene 60 corresponding to a racing battle includes a position point A and a position point B. The position point A is an $i^{th}$ position point of the first virtual object, and the position point B is an $(i+1)^{th}$ position point of the first virtual object. Three position points, recorded as a position point 1, a position point 2, and a position point 3, may be obtained between the position point A and the position point B by using the linear interpolation technology and according to the movement trajectory of the fourth virtual object. The movement trajectory of the third virtual object passes through the position point A, the position point 1, the position point 2, the position point 3, and the position point B sequentially.

In this embodiment of this application, a specific value of k may be set with reference to an actual application situation. During actual application, when the value of k is larger, a quantity of position points of the third virtual object is larger, and correspondingly, the movement trajectory of the third virtual object is smoother and more natural. However, when the value of k is larger, an amount of computing and processing overhead is larger, and an additional processing load is brought to the terminal. Therefore, during actual application, a smooth requirement of a movement trajectory and processing overhead of the terminal can be balanced comprehensively to determine a specific value of k.

In some embodiments, in the k position points, each pair of two adjacent position points have an equal distance. The distance between each pair of two adjacent position points may be a straight-line distance between the pair of two adjacent position points, or may be a movement trajectory distance between the pair of two adjacent position points. In some other embodiments, distances between two adjacent position points may be different. For example, in the movement trajectory from the $i^{th}$ position point to the $(i+1)^{th}$ position point, position points included in a partial trajectory with a larger curvature are denser, and position points included in a partial trajectory with a smaller curvature are sparser. In some embodiments, in the movement trajectory from the $i^{th}$ position point to the $(i+1)^{th}$ position point, a partial movement trajectory with a shape of a straight-line segment only includes two position points, and the two position points are located at two end points of the straight-line segment respectively.

In summary, according to the technical solutions provided in this embodiment of this application, n position points of a first virtual object are carried in trajectory information of the first virtual object, and a fourth virtual object is controlled to move according to the n position points. In this case, a movement trajectory of the fourth virtual object is similar to a movement trajectory of the first virtual object. In addition, a movement trajectory of a third virtual object that races against a second virtual object controlled by a second user account in a racing battle is obtained according to the movement trajectory of the fourth virtual object, thereby smoothing the movement trajectory of the fourth virtual object, making the performance of the third virtual object more vivid and realistic, further satisfying user requirements, and improving the man-machine interaction experience.

In one implementation, the obtaining first recorded trajectory information includes: obtaining a capability value of the second user account; transmitting an information obtaining request to a server, the information obtaining request including the capability value of the second user account; receiving at least one piece of recorded trajectory information that is transmitted by the server and matches the capability value of the second user account; and selecting the first recorded trajectory information from the at least one piece of recorded trajectory information.

A capability value is used for indicating a racing capability of a virtual object. For example, when the virtual object is in a race car form, the capability value is used for indicating a capability of the virtual race car when the virtual race car races against other virtual race cars in a racing battle. In some embodiments, a capability value is calculated according to a finish time of a virtual object in a racing battle. For example, the capability value has a negative correlation with the finish time of the virtual object in the racing battle. That is, a shorter finish time indicates a greater capability value, and a longer finish time indicates a smaller capability value.

In this embodiment of this application, the server maintains a database, and the database includes a racing video and trajectory information of a virtual object in a racing battle. In addition, a preset matching rule is configured on the server. That is, when receiving a video obtaining request including a capability value of a second user account, the server calculates, according to the preset matching rule, a capability value range matching the capability value, and then the client downloads recorded trajectory information corresponding to the capability value range from the database maintained by the server.

In some embodiments, the matching rule configured on the server includes a capability value and a correction factor of the capability value. In an example, the correction factor of the capability value may be a quantity of defeats of racing battles. In some embodiments, the matching rule configured on the server includes: calculating, when a correction factor of a capability value of a second user account is greater than a preset threshold, a capability value range matching the capability value of the second user account in a range less than the capability value; calculating, when a correction factor of a capability value of a second user account is less than a preset threshold, a capability value range matching the capability value of the second user account in a range greater than the capability value; or calculating, when a correction factor of a capability value of a second user account is equal to a preset threshold, a capability value range matching the capability value of the second user account in a range around and including the capability value. For example, the capability value of the second user account carried in the video obtaining request received by the server is 120 and the preset threshold is 100. If the correction factor of the capability value of the second user account is 120, a capability value range calculated by the server according to the matching rule is 100 to 110. If the correction factor of the capability value of the second user account is 80, a capability value range calculated by the server according to the matching rule is 130 to 140. If the correction factor of the capability value of the second user account is 100, a capability value range calculated by the server according to the matching rule is 110 to 130.

After receiving the capability value range matched by the server, the client downloads recorded trajectory information corresponding to the capability value range from the server according to the capability value range, and there is at least one piece of recorded trajectory information. In some embodiments, the client selects trajectory information of the first virtual object from the at least one piece of downloaded trajectory information by using a random algorithm.

In summary, according to the technical solutions provided in this embodiment of this application, at least one piece of recorded trajectory information is matched according to a capability value of a user account, and required recorded trajectory information is selected from the at least one piece of recorded trajectory information, thereby accurately matching recorded trajectory information that adapts to a capability value of a user account, and providing racing opponents whose capabilities match that of the user account to the user account. For users having different capabilities, recorded trajectory information matching capabilities of the users may be provided in this embodiment of this application, so that a user can start a racing battle with opponents whose capabilities matching a capability of the user.

In one implementation, to get closer to a condition when a real user controls a virtual object to race, the foregoing method further includes: controlling, in the racing battle when the third virtual object has an abnormal condition, the third virtual object to enter a free performance state according to the abnormal condition; and continuing to control movement of the third virtual object according to the first recorded trajectory information after the free performance state ends.

An abnormal condition is an unpredictable condition of a third virtual object in a racing battle. For example, the abnormal condition includes that: the third virtual object crashes, the third virtual object falls into water, and the third virtual object is hit by a virtual item. This is not limited in this embodiment of this application. A free performance state is a necessary performance of the third virtual object in a case of an abnormal condition. The bottom dynamic logic of the client controls the third virtual object according to different abnormal conditions to perform different free performances. For example, when the third virtual object crashes, the client calculates a free performance state, for example, moving backward by a particular distance, of the third virtual object by using the bottom dynamic logic according to information such as impact force, gravity, and friction acting on the third virtual object. In another example, when the third virtual object is hit by a virtual item, the client calculates a free performance state, for example, falling to the ground after being hit into the sky by the virtual item with a particular angle and direction, of the third virtual object by using the bottom dynamic logic according to information such as a magnitude and direction of the impact force acting on the third virtual object. In yet another example, when the third virtual object falls into water, the client calculates a free performance state, for example, struggling from a river to a river bank and returning to the track, of the third virtual object by using the bottom dynamic logic according to information such as a distance between the third virtual object and the river bank and the depth of the river. In this embodiment of this application, durations of free performances corresponding to different abnormal conditions may be different. For example, a duration of a free performance of a crash may be less than a duration of a free performance of falling into water. Durations of free performances corresponding to the same abnormal conditions at different abnormal levels may also be different, for example, a duration of a free performance of having a slight crash is less than a duration of a free performance of having a heavy crash.

In some embodiments, the first recorded trajectory information includes: n position points of the first virtual object, n being an integer greater than 1; and the continuing to control movement of the third virtual object according to the first recorded trajectory information includes: controlling the third virtual object to move from a position point at which the free performance state ends to a target position point in the n position points, the target position point being a position point that is in position points through which the third virtual object does not pass and is closest to the position point at which the free performance state ends; and controlling the third virtual object to start to continue to move from the target position point.

In a process that the third virtual object moves from the position point at which the free performance state ends to the target position point in the n position points, the third virtual object is in an automatic driving state. In some embodiments, the third virtual object has two automatic driving control manners, that is, the controlling the third virtual object to move from a position point at which the free performance state ends to a target position point in the n position points includes: obtaining an angle between the third virtual object and the target position point and an orientation of the third virtual object; and controlling the third virtual object according to the orientation and the angle to move to the target position point; or obtaining a current state of the third virtual object; and controlling the third virtual object according to the current state and by using a behavior tree to move to the target position point.

A behavior tree is a formal graphical modeling language, and the behavior tree in this embodiment of this application is closer to a decision tree. A decision tree is a graphical method of intuitively using probability analysis. A decision tree usually includes a decision point, a state node, and a result node. The decision point is a selection of several possible solutions, and the state node is an expected value of an alternative solution. In this embodiment of this application, the behavior tree is obtained through training by using a large quantity of behaviors. A decision may be quickly made according to a current state of a virtual object by using the behavior tree, and the virtual object is controlled according to the decision to move.

Figure 7:
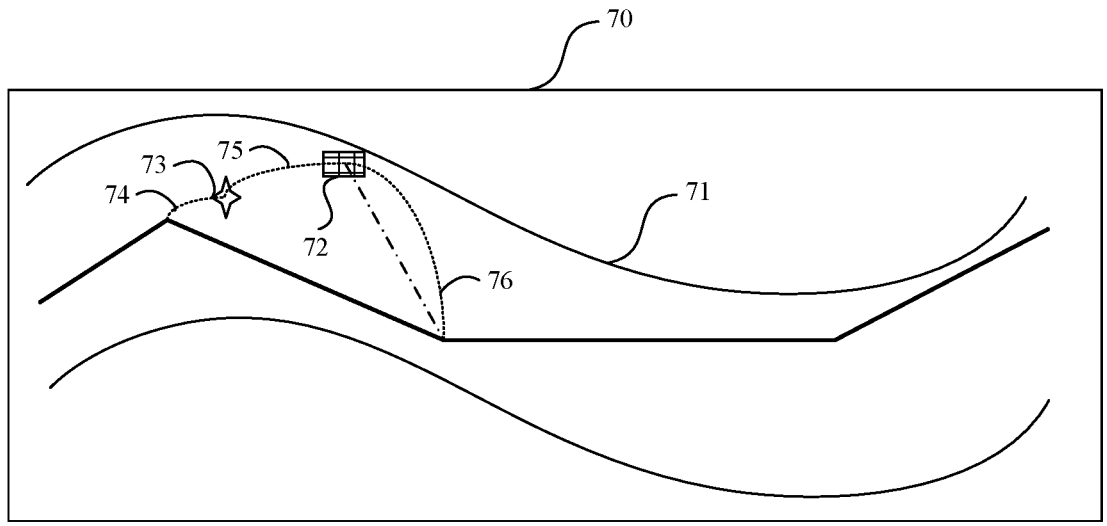
FIG. 7 is a schematic diagram of a virtual environment according to yet another embodiment of this application.

For example, as shown in FIG. 7, a particular section of virtual track 71 in a virtual scene 70 corresponding to a racing battle includes a third virtual object 72 and an obstacle 73. A movement trajectory of the third virtual object 72 before a crash into the obstacle 73 is a movement trajectory 74. If the third virtual object 72 crashes into the obstacle 73 during moving, the third virtual object 72 enters a free performance state, that is, a state of being not controlled by a movement trajectory of a fourth virtual object. When the third virtual object 72 crashes into the obstacle 73, the client calculates information such as a moving direction and moving speed of the third virtual object 72 according to information such as a magnitude and direction of an impact force acting on the third virtual object 72, and then the computer controls the third virtual object 72 according to the information to enter a free performance state. A movement trajectory of the third virtual object 72 in the free performance state is a movement trajectory 75. When the free performance state ends, the third virtual object 72 is located at a position point A and the target position point is located at a position point B, the third virtual object 72 is controlled to move from the position point A to the position point B in an automatic driving manner, to form a movement trajectory 76. The movement trajectory 75 and the movement trajectory 76 are combined to form a movement trajectory of the third virtual object 72 from a start time of the abnormal condition to a time before the third virtual object 72 is controlled according to the first recorded trajectory information.

In this embodiment of this application, when the third virtual object enters the free performance state, the first recorded trajectory information is paused, and when the automatic driving state ends, the recorded trajectory information continues to be played. For example, the third virtual object enters an abnormal condition when the first recorded trajectory information is played to the $0.5^{th}$ s, and the recorded trajectory information is paused at the $0.5^{th}$ s. When an automatic driving state of the third virtual object after the free performance ends, that is, when the third virtual object has moved to the target position point, the recorded trajectory information continues to be played from the $0.5^{th}$ s, and the third virtual object is controlled to move.

In summary, according to the technical solutions provided in this embodiment of this application, by adding an abnormal condition handling mechanism, that is, a virtual object may perform necessary free performances when having an abnormal condition during racing, a performance state of a racing battle better conforms to a performance state of a virtual object controlled by a real user. Moreover, after the free performance ends and the virtual object is controlled to move to the target position point, the virtual object continues to be controlled by using the first recorded trajectory information to move, to make the performance of the virtual object more coordinated and coherent.

In one implementation, to ensure that the third virtual object and the second virtual object remain in a racing state to better satisfy user requirements, after the controlling movement of the third virtual object according to the first recorded trajectory information, the method further includes: detecting whether a position relationship between the second virtual object and the third virtual object satisfies a first preset condition; obtaining second recorded trajectory information when the position relationship satisfies the first preset condition, the second recorded trajectory information being another piece of recorded trajectory information different from the first recorded trajectory information; and controlling movement of the third virtual object according to the second recorded trajectory information in the racing battle.

The second recorded trajectory information and the first recorded trajectory information may be different in scores or collection manners. In this embodiment of this application, a collection manner of recorded trajectory information includes an automatic collection manner and a manual collection manner. In the automatic collection manner, the client automatically saves recorded trajectory information after a racing battle ends and uploads the information selectively to the server according to a score of the recorded trajectory information. In the manual collection manner, racing is performed on a particular track by using a particular user account and an internal game version, and recorded trajectory information corresponding to the racing battle is uploaded to the server. The manual collection manner is relatively time and labor consuming, so that manually collected recorded trajectory information is usually used for a user with a relatively high capability value or a relatively complex racing battle, that is, is usually used for a racing expert.

For example, when the second recorded trajectory information is different from the first recorded trajectory information in scores, the obtaining the second recorded trajectory information includes: selecting, when a position of the second virtual object is ahead of a position of the third virtual object and a leading distance is greater than a first threshold, the second recorded trajectory information from other pieces of recorded trajectory information whose scores are higher than that of the first recorded trajectory information; and selecting, when the position of the second virtual object falls behind the position of the third virtual object and a falling-behind distance is greater than a second threshold, the second recorded trajectory information from other pieces of recorded trajectory information whose scores are lower than that of the first recorded trajectory information.

For example, it is assumed that the first threshold is 8 m and the second threshold is 7 m, if the position of the second virtual object is 10 m ahead of the position of the third virtual object and a score of the first recorded trajectory information is 80, the second recorded trajectory information is selected from other pieces of recorded trajectory information whose scores are higher than 80; and if the position of the second virtual object falls behind the position of the third virtual object by 8 m and a score of the first recorded trajectory information is 80, the second recorded trajectory information is selected from other pieces of recorded trajectory information whose scores are lower than 80.

For example, the second recorded trajectory information is different from the first recorded trajectory information in collection manners, and the selecting the second recorded trajectory information includes: selecting, when a position of the second virtual object is ahead of a position of the third virtual object, a leading distance is greater than a first threshold, and the first recorded trajectory information is an automatically collected racing video, the second recorded trajectory information from manually collected recorded trajectory information; and selecting, when the position of the second virtual object falls behind the position of the third virtual object and a falling-behind distance is greater than a second threshold and the first recorded trajectory information is manually collected recorded trajectory information, the second recorded trajectory information from automatically collected recorded trajectory information.

For example, it is assumed that the first threshold is 8 m and the second threshold is 7 m, if the position of the second virtual object is 10 m ahead of the position of the third virtual object and the first recorded trajectory information is automatically collected recorded trajectory information, the second recorded trajectory information is selected from manually collected recorded trajectory information; and if the position of the second virtual object falls behind the position of the third virtual object by 8 m and the first recorded trajectory information is manually collected recorded trajectory information, the second recorded trajectory information is selected from automatically collected recorded trajectory information.

In this embodiment of this application, the first threshold and the second threshold may have the same value or different values. This is not limited in this embodiment of this application.

In summary, according to the technical solutions provided in this embodiment of this application, it is detected whether a position relationship between a virtual object controlled by a user account and a virtual object controlled by a computer satisfies a first preset condition, and then it is determined according to a detection result whether to change recorded trajectory information of a movement trajectory of the virtual object controlled by the computer to another piece of recorded trajectory information, so as to ensure that the virtual object controlled by the computer and the virtual object controlled by the user account remain in a racing state, thereby preventing a position of the virtual object controlled by the computer from moving excessively ahead of a position of the virtual object controlled by the user account or excessively falling behind the position of the virtual object controlled by the user account, to provide users with more intense game racing experience.

In one implementation, the method further includes: recording trajectory information of the second virtual object in the racing battle; determining, according to the trajectory information of the second virtual object, whether the trajectory information satisfies a second preset condition; and uploading the trajectory information to the server when the trajectory information satisfies the second preset condition.

In this embodiment of this application, recorded trajectory information in a database maintained by the server is classified according to a particular classification rule and stored. For example, the recorded trajectory information in the database is classified according to different tracks and stored. Required filling quantities of recorded trajectory information under each category in the database may be the same or different. In some embodiments, the server determines required filling quantities of recorded trajectory information under different track categories according to difficulty levels of tracks. For example, for a relatively simple track A, a quantity of pieces of recorded trajectory information to be filled required by the server is 10, but for a relatively complex track B, a quantity of pieces of recorded trajectory information to be filled required by the server is 20.

In some embodiments, to reduce overhead of the client and save a storage space of the server, the client records trajectory information of the second virtual object and uploads trajectory information whose scores satisfy the second preset condition to the server only when a quantity of pieces of recorded trajectory information in the database maintained by the server is insufficient. For example, when a quantity of pieces of recorded trajectory information under a particular category in the database maintained by the server does not satisfy a required filling quantity, the server transmits a record instruction to the client, the record instruction including a quantity of pieces of lacking recorded trajectory information. The client starts to record trajectory information of the second virtual object after receiving the record instruction and uploads the trajectory information to the server.

In some embodiments, the second preset condition includes at least one of the following: a distance by which the second virtual object moves backward is less than or equal to a distance threshold, a duration for which the second virtual object stays in place is less than or equal to a first time threshold, and an idle time of the second user account is less than or equal to a second time threshold.

Moving backward means that a moving direction of the second virtual object is opposite to a direction of the track. When the moving direction of the second virtual object is opposite to the direction of the track, a distance by which the second virtual object moves backward is recorded. In an example, if a maximum distance by which the second virtual object moves backward in a racing battle recorded by the client is less than or equal to the distance threshold, it is determined that the trajectory information corresponding to the second virtual object satisfies the second preset condition. In another example, if an overall distance by which the second virtual object moves backward in a racing battle recorded by the client is less than or equal to the distance threshold, it is determined that the trajectory information corresponding to the second virtual object satisfies the second preset condition. In some embodiments, the client determines, according to a direction of a connecting line between every two position points in the track, whether the second virtual object is in a backward moving state.

Staying in place means that the second virtual object does not move out of a preset range within a preset time. In some embodiments, the preset time is a time for the first virtual object to move from an ith position point to an (i+1)th position point, i being a positive integer. The preset range is a track range between the ith position point and the (i+1)th position point. In an example, if a maximum duration of staying in place in a racing battle recorded by the client is less than or equal to the first time threshold, it is determined that the trajectory information corresponding to the second virtual object satisfies the second preset condition. In another example, if an overall duration of staying in place in a racing battle recorded by the client is less than or equal to the first time threshold, it is determined that the trajectory information corresponding to the second virtual object satisfies the second preset condition.

An idle time is a time when input data of a client corresponding to the second user account is zero. In some embodiments, when detecting that there is no input data at a particular position point, the client starts to record a time when the input data is zero, and stops recording until there is input data at a particular position point. In an example, if a maximum idle time in a racing battle recorded by the client is less than or equal to the second time threshold, it is determined that the trajectory information corresponding to the second virtual object satisfies the second preset condition. In another example, if an accumulated idle time in a racing battle recorded by the client is less than or equal to the second time threshold, it is determined that the trajectory information corresponding to the second virtual object satisfies the second preset condition.

In summary, according to the technical solutions provided in this embodiment of this application, trajectory information corresponding to virtual objects satisfying a second preset condition is selected and uploaded to a server, so that a storage load of the server is reduced. Moreover, in this embodiment of this application, only when recorded trajectory information in a database stored by the server is insufficient, the client is notified to record trajectory information of the virtual objects, thereby reducing processing overhead of the client.

In one implementation, to discover and resolve existing problems of position points and recorded trajectory information, a computer device connected to the server may analyze the recorded trajectory information by using testing and debugging tools.

In some embodiments, the testing and debugging tools include a video visualization tool, and the video visualization tool is configured to visualize recorded trajectory information. When recording trajectory information and a racing video of the second virtual object, the client records many position points and corresponding data information. Therefore, a track corresponding to a racing battle may be loaded on the computer device by using the video visualization tool, and then lines and dots in the track are used for representing the data information, to help print the recorded trajectory information for a deep analysis and quickly locate an existing problem in the position points, for example, a problem of missing position points, so as to quickly determine a solution to the problem.

Figure 8:
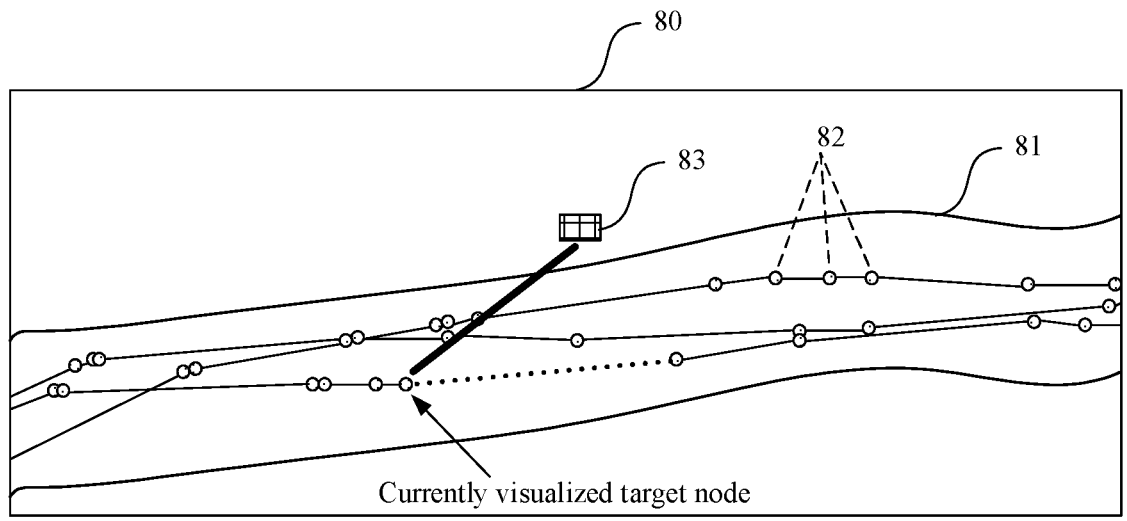
FIG. 8 is a schematic diagram of a user interface (UI) of a computer device according to an embodiment of this application.

For example, as shown in FIG. 8, a UI 80 is displayed in a computer device. The UI 80 has a corresponding virtual scene, and a virtual track 81, position points 82, and a third virtual object 83 are displayed in the virtual scene. Because the computer device is provided with a video visualization tool, in the UI 80 displayed in the computer device, lines and dots are used for representing important data information. For example, all position points 82 are represented by solid dots, a target position point 82 of automatic driving of the third virtual object is identified by using a thick solid line, and a connecting line between two position points 82 that are not used by the third virtual object due to an abnormal condition is identified by using a thin dotted line.

In some embodiments, the testing and debugging tools include an accurate replay tool. In an application log, each piece of recorded trajectory information, matched in a racing battle, of a virtual object controlled by the second user account has a unique identifier, and the identifier may be represented in an ID form. The computer device transmits one or more identifiers to the server, and the server forcefully matches recorded trajectory information corresponding to the identifier in a racing battle of the computer device after receiving the identifier, so as to accurately replay the racing battle and reconstruct a movement trajectory of a virtual object, to discover and resolve existing problems in the position points, for example, missing position points.

In some embodiments, the testing and debugging tools include a batch analysis tool. The server may export a stored database into a compressed package, and a batch analysis tool corresponding to the computer device may analyze all recorded trajectory information in the compressed package. Position point information corresponding to the recorded trajectory information may be parsed out according to a preset decompression and parsing rule. The information may be exported into a work sheet to conveniently discover and analyze problems in position points and recorded trajectory information, for example, problems that initial position points in all the position points are inconsistent and a power model in the recorded trajectory information excessively falls behind, thereby resolving these problems in time.

In this embodiment of this application, the computer device may analyze the recorded trajectory information by using the testing and debugging tools separately, or may use the combined testing and debugging tools to analyze the recorded trajectory information. This is not limited in this embodiment of this application.

In summary, according to the technical solutions provided in this embodiment of this application, particular testing and debugging tools are used to analyze recorded trajectory information in a computer device connected to a server, to help discover in time and accurately locate existing problems in position points and/or recorded trajectory information, thereby further improving a system of a method for controlling movement of a virtual object.

Figure 9:
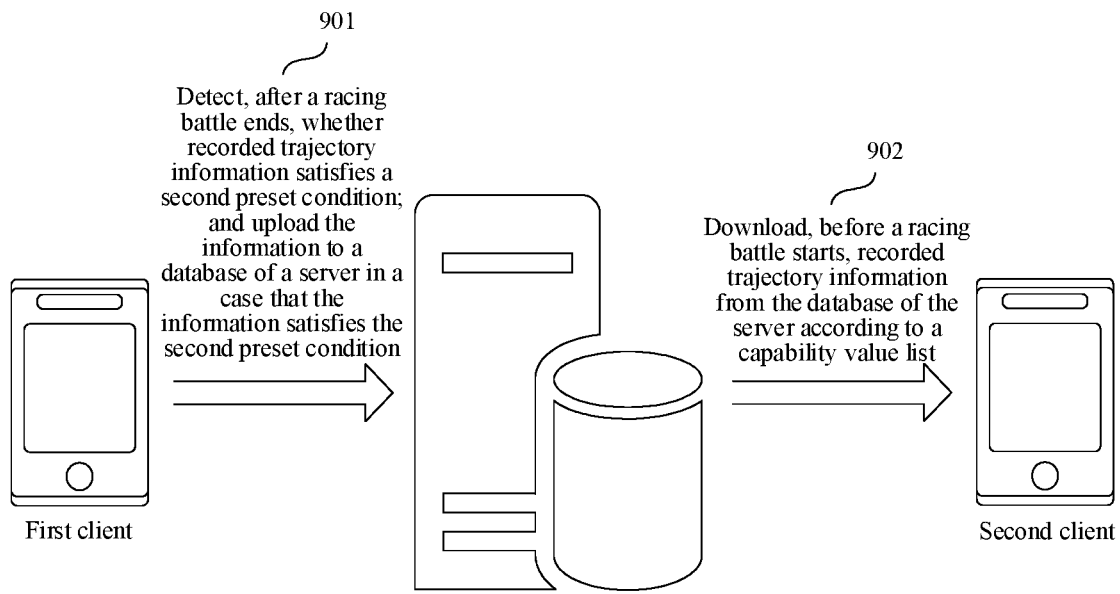
FIG. 9 is a flowchart of a method for controlling movement of a virtual object according to another embodiment of this application.

In one implementation, referring to FIG. 9, the method for controlling movement of a virtual object provided in this embodiment of this application may include the following several steps (901 and 902):

Step 901: Detect, for a first client and after a racing battle ends, whether recorded trajectory information satisfies a second preset condition; and upload the information to a database of a server when the information satisfies the second preset condition.

Step 902: Download, for a second client and before a racing battle starts, recorded trajectory information from the database of the server according to a capability value list.

The following is an apparatus embodiment of this application, which can be used to perform the method embodiments of this application. For details not disclosed in the apparatus embodiment of this application, reference may be made to the method embodiments of this application.

Figure 10:
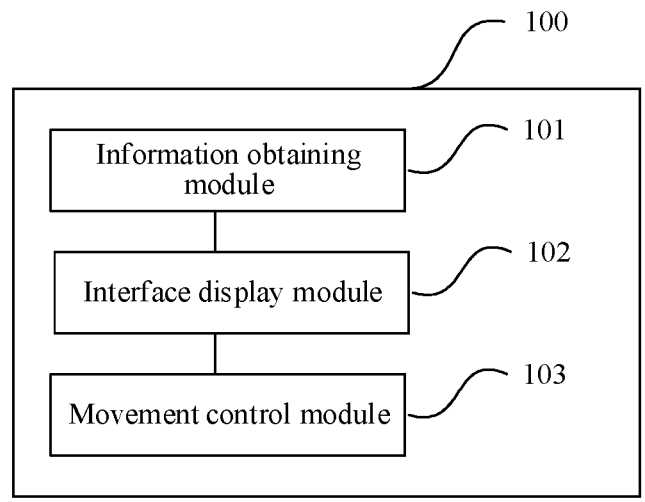
FIG. 10 is a block diagram of an apparatus for controlling movement of a virtual object according to another embodiment of this application.

FIG. 10 is a block diagram of an apparatus for controlling movement of a virtual object according to an embodiment of this application. The apparatus has functions of implementing the foregoing method examples. The functions may be implemented by using hardware, or may be implemented by hardware executing corresponding software. The apparatus may be a terminal or disposed in a terminal. The apparatus 100 may include: an information obtaining module 101, an interface display module 102, and a movement control module 103.

The information obtaining module 101 is configured to obtain first recorded trajectory information, the first recorded trajectory information being information that is recorded when a first user account controls a first virtual object to race in a virtual scene and is used for drawing a movement trajectory of the first virtual object.

The interface display module 102 is configured to display a racing battle interface, the racing battle interface being used for presenting a racing battle including a second virtual object and a third virtual object, the second virtual object being a virtual object controlled by a second user account, the third virtual object being a virtual object controlled by a computer.

The movement control module 103 is configured to control movement of the third virtual object according to the first recorded trajectory information in the racing battle.

In an exemplary embodiment, the first recorded trajectory information includes: n position points of the first virtual object, n being an integer greater than 1; and the movement control module 103 is further configured to: control a fourth virtual object to move according to the n position points under the drive of a power model, the fourth virtual object being a virtual object that is controlled by the computer and is invisible in the racing battle interface; determine a movement trajectory of the third virtual object according to a movement trajectory of the fourth virtual object; and control the third virtual object to move according to the movement trajectory of the third virtual object.

In an exemplary embodiment, the movement control module 103 is further configured to: drive, for an $i^{th}$ position point in the n position points by using the power model, the fourth virtual object according to state information of the fourth virtual object at the $i^{th}$ position point to move to an $(i+1)^{th}$ position point, i being a positive integer; detect, in a case a timestamp corresponding to the $(i+1)^{th}$ position point is reached, whether the fourth virtual object is located at the $(i+1)^{th}$ position point; and control, when the fourth virtual object is not located at the $(i+1)^{th}$ position point, the fourth virtual object to teleport to the $(i+1)^{th}$ position point.

In an exemplary embodiment, the movement control module 103 is further configured to obtain k position points located between an ith position point and an (i+1)th position point through sampling in a movement trajectory of the fourth virtual object from the ith position point to the (i+1)th position point, i being a positive integer, k being a positive integer; and determine a movement trajectory of the third virtual object from the ith position point to the (i+1)th position point according to the ith position point, the k position points, and the (i+1)th position point.

In an exemplary embodiment, the information obtaining module 101 is further configured to: obtain a capability value of the second user account; transmit an information obtaining request to a server, the information obtaining request including the capability value of the second user account; receive at least one piece of recorded trajectory information that is transmitted by the server and matches the capability value of the second user account; and select the first recorded trajectory information from the at least one piece of recorded trajectory information.

Figure 11:
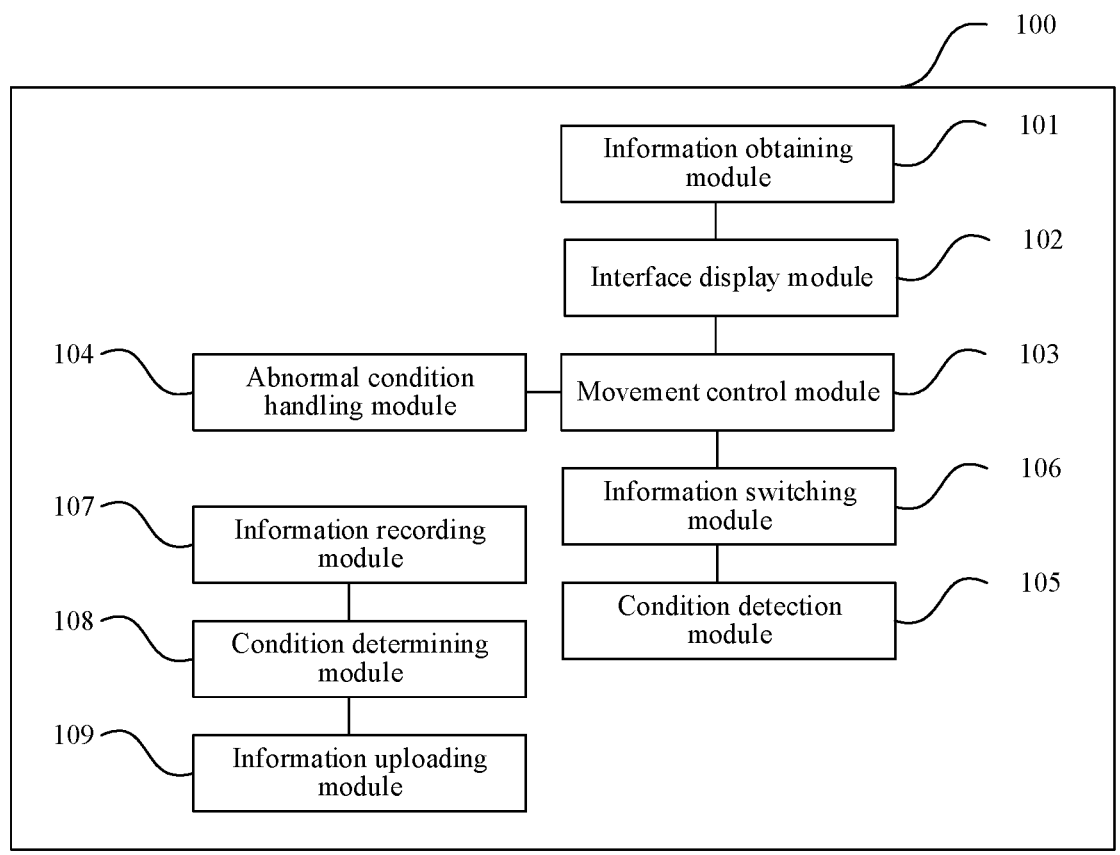
FIG. 11 is a block diagram of an apparatus for controlling movement of a virtual object according to another embodiment of this application.

In an exemplary embodiment, as shown in FIG. 11, the apparatus 100 further includes: an abnormal condition handling module 104, configured to control, in the racing battle when the third virtual object has an abnormal condition, the third virtual object to enter a free performance state according to the abnormal condition; and the movement control module 103 is further configured to continue to control movement of the third virtual object according to the first recorded trajectory information after the free performance state ends.

In an exemplary embodiment, the first recorded trajectory information includes: n position points of the first virtual object, n being an integer greater than 1; and the movement control module 103 is further configured to: control the third virtual object to move from a position point at which the free performance state ends to a target position point in the n position points, the target position point being a position point that is in position points through which the third virtual object does not pass and is closest to the position point at which the free performance state ends; and control the third virtual object to start to continue to move from the target position point.

In an exemplary embodiment, the movement control module 103 is further configured to: obtain an angle between the third virtual object and the target position point and an orientation of the third virtual object; and control the third virtual object according to the orientation and the angle to move to the target position point; or obtain a current state of the third virtual object; and control the third virtual object according to the current state and by using a behavior tree to move to the target position point.

In an exemplary embodiment, as shown in FIG. 11, the apparatus 100 further includes: a condition detection module 105, configured to detect whether a position relationship between the second virtual object and the third virtual object satisfies a first preset condition; and an information switching module 106, configured to obtain second recorded trajectory information when the position relationship satisfies the first preset condition, the second recorded trajectory information being another piece of recorded trajectory information different from the first recorded trajectory information; the movement control module 103 being further configured to control movement of the third virtual object according to the second recorded trajectory information in the racing battle.

In an exemplary embodiment, as shown in FIG. 11, the information switching module 106 is further configured to: select, when a position of the second virtual object is ahead of a position of the third virtual object and a leading distance is greater than a first threshold, the second recorded trajectory information from other pieces of recorded trajectory information whose scores are higher than that of the first recorded trajectory information; and select, when the position of the second virtual object falls behind the position of the third virtual object and a falling-behind distance is greater than a second threshold, the second recorded trajectory information from other pieces of recorded trajectory information whose scores are lower than that of the first recorded trajectory information.

In an exemplary embodiment, as shown in FIG. 11, the apparatus 100 further includes: an information recording module 107, configured to record trajectory information of the second virtual object in the racing battle; a condition determining module 108, configured to determine, according to the trajectory information of the second virtual object, whether the trajectory information satisfies a second preset condition; and an information uploading module 109, configured to upload the trajectory information to the server when the trajectory information satisfies the second preset condition.

In an exemplary embodiment, the second preset condition includes at least one of the following: a distance by which the second virtual object moves backward is less than or equal to a distance threshold, a duration for which the second virtual object stays in place is less than or equal to a first time threshold, and an idle time of the second user account is less than or equal to a second time threshold.

In summary, according to the technical solutions provided in this embodiment of this application, in a racing battle of a virtual object controlled by a user account and a virtual object controlled by a computer, a computer program in a terminal controls the virtual object according to recorded trajectory information to move. Therefore, a new manner for controlling movement corresponding to a virtual object is expanded in a racing game application, that is, a virtual object is controlled according to recorded trajectory information to move, which helps reduce dependency on complex logic decision-making control manners in a racing battle, and expand a manner for controlling movement of a virtual object.

Moreover, recorded trajectory information is information generated when a user account controls a virtual object to move in a history racing battle. Compared with a problem of unnatural performance of a virtual object by controlling movement of the virtual object according to the logic decision-making technology, for example, a problem that the virtual object frequently brakes or crashes into walls, controlling a virtual object according to recorded trajectory information to move may make the performance of the virtual object more vivid and realistic and closer to a moving state of a virtual object controlled by the user account, thereby improving the product performance of the racing game application, for example, improving a screen display effect of the racing battle, so as to improve user product experience.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 12:
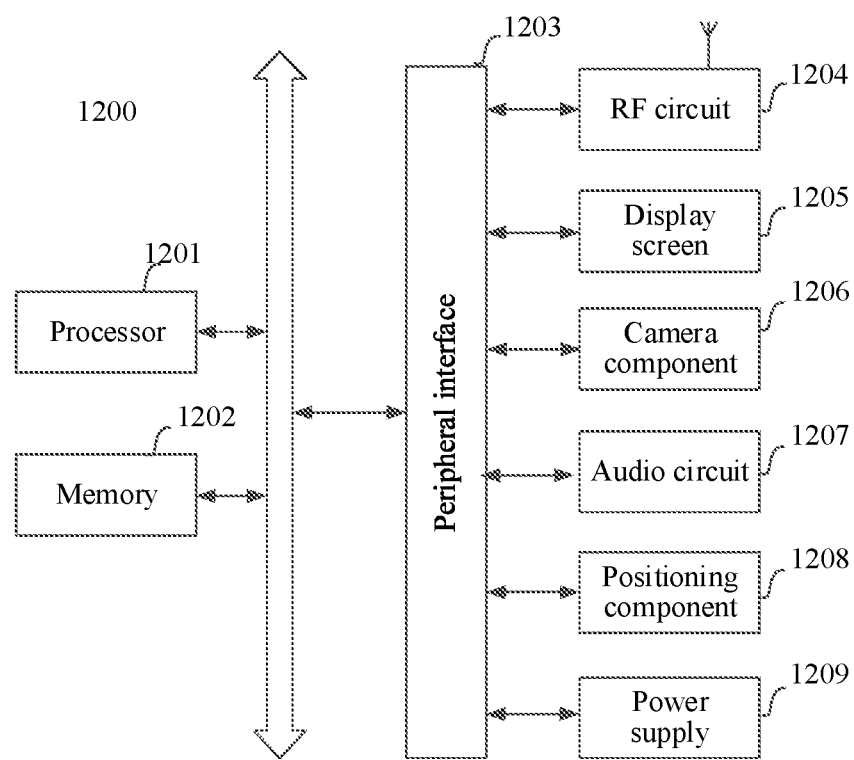
FIG. 12 is a structural block diagram of a terminal according to an embodiment of this application.

FIG. 12 is a structural block diagram of a terminal 1200 according to an embodiment of this application. The terminal 1200 may be a portable electronic device, such as a mobile phone, a tablet computer, a game console, an ebook reader, a multimedia playback device, and a wearable device. The terminal is configured to implement the method for controlling movement of a virtual object provided in the foregoing embodiments. The terminal may be the terminal 10 in the implementation environment shown in FIG. 1. Specifically: the terminal 1200 includes a processor 1201 and a memory 1202.

The processor 1201 may include one or more processing cores, for example, a 4-core processor or an 8-core processor. The processor 1201 may be implemented by using at least one hardware form of a digital signal processor (DSP), a field programmable gate array (FPGA), and a programmable logic array (PLA). The processor 1201 may alternatively include a main processor and a coprocessor. The main processor is configured to process data in an active state, also referred to as a central processing unit (CPU). The coprocessor is a low-power processor configured to process data in a standby state. In some embodiments, the processor

1201 may be integrated with a graphics processing unit (GPU). The GPU is configured to render and draw content that needs to be displayed on a display. In some embodiments, the processor 1201 may further include an AI processor. The AI processor is configured to process computing operations related to machine learning (ML).

The memory 1202 may include one or more computer-readable storage media. The computer-readable storage media may be non-transient. The memory 1202 may further include a high-speed random access memory (RAM) and a non-volatile memory, such as one or more magnetic disk storage devices or flash storage devices. In some embodiments, the non-transient computer-readable storage medium in the memory 1202 is configured to store at least one instruction, at least one program, a code set, or an instruction set, the at least one instruction, the at least one program, the code set, or the instruction set being configured to be executed by one or more processors to implement the method for controlling movement of a virtual object.

In some embodiments, the terminal 1200 may optionally include a peripheral interface 1203 and at least one peripheral. The processor 1201, the memory 1202, and the peripheral interface 1203 may be connected by using a bus or a signal cable. Each peripheral may be connected to the peripheral interface 1203 by using a bus, a signal cable, or a circuit board. Specifically, the peripheral includes at least one of a radio frequency (RF) circuit 1204, a display screen 1205, a camera component 1206, an audio circuit 1207, a positioning component 1208, and a power supply 1209.

A person skilled in the art may understand that the structure shown in FIG. 12 constitutes no limitation on the terminal 1200, and the terminal may include more or fewer components than those shown in the figure, or some components may be combined, or a different component deployment may be used.

In an exemplary embodiment, a computer-readable storage medium is further provided, storing at least one instruction, at least one program, a code set, or an instruction set, the at least one instruction, the at least one program, the code set, or the instruction set, when executed by a processor, implementing the foregoing method for controlling movement of a virtual object.

In some embodiments, the computer-readable storage medium may include: a read-only memory (ROM), a RAM, a solid state drive (SSD), an optical disc, or the like. The RAM may include a resistive RAM (ReRAM) and a dynamic RAM (DRAM).

In an exemplary embodiment, a computer program product is further provided, the computer program product, when executed by a processor, being used for implementing the method for controlling movement of a virtual object.

"A plurality of" mentioned in the specification means two or more. "And/or" describes an association relationship for associated objects and represents that three relationships may exist. For example, A and/or B may represent the following three cases: only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for controlling movement of a virtual object in a virtual environment performed by a terminal, the method comprising:
   obtaining first recorded trajectory information, the first recorded trajectory information being information that is recorded when a first user account of an online gaming application controls a first virtual object to race in a virtual scene of the virtual environment and is used for drawing a movement trajectory of the first virtual object in the virtual scene of the virtual environment;
   displaying a racing battle interface, the racing battle interface being used for presenting a racing battle comprising a second virtual object and a third virtual object, the second virtual object being a virtual object controlled by a second user account of the online gaming application, the third virtual object being a virtual object controlled by a computer; and
   controlling movement of the third virtual object according to the first recorded trajectory information in the racing battle, further including:
   generating a fourth virtual object in the racing battle, the fourth virtual object being invisible in the racing battle interface;
   controlling the fourth virtual object to move based on the first recorded trajectory information; and
   controlling the third virtual object to follow the fourth virtual object, the third virtual object being visible in the racing battle interface.

2. The method according to claim 1, wherein the first recorded trajectory information comprises: n position points of the first virtual object, n being an integer greater than 1; and
   the controlling movement of the third virtual object according to the first recorded trajectory information comprises:
   controlling the fourth virtual object to move according to the n position points under the drive of a power model;
   determining a movement trajectory of the third virtual object according to a movement trajectory of the fourth virtual object; and
   controlling the third virtual object to move according to the movement trajectory of the third virtual object.

3. The method according to claim 2, wherein the controlling the fourth virtual object to move according to the n position points under the drive of a power model comprises:
   driving, for an $i^{th}$ position point in the n position points by using the power model, the fourth virtual object according to state information of the fourth virtual object at the $i^{th}$ position point to move to an $(i+1)^{th}$ position point, i being a positive integer;
   detecting, in a case a timestamp corresponding to the $(i+1)^{th}$ position point is reached, whether the fourth virtual object is located at the $(i+1)^{th}$ position point; and
   controlling, when the fourth virtual object is not located at the $(i+1)^{th}$ position point, the fourth virtual object to teleport to the $(i+1)^{th}$ position point.

4. The method according to claim 2, wherein the determining a movement trajectory of the third virtual object according to a movement trajectory of the fourth virtual object comprises:

obtaining k position points located between an $i^{th}$ position point and an $(i+1)^{th}$ position point through sampling in a movement trajectory of the fourth virtual object from the $i^{th}$ position point to the $(i+1)^{th}$ position point, i being a positive integer, k being a positive integer; and determining a movement trajectory of the third virtual object from the $i^{th}$ position point to the $(i+1)^{th}$ position point according to the $i^{th}$ position point, the k position points, and the $(i+1)^{th}$ position point.

5. The method according to claim 1, wherein the obtaining first recorded trajectory information comprises:

obtaining a capability value of the second user account;

transmitting an information obtaining request to a server, the information obtaining request comprising the capability value of the second user account;

receiving at least one piece of recorded trajectory information that is transmitted by the server and matches the capability value of the second user account; and selecting the first recorded trajectory information from the at least one piece of recorded trajectory information.

6. The method according to claim 1, further comprising:

controlling, in the racing battle when the third virtual object has an abnormal condition, the third virtual object to enter a free performance state according to the abnormal condition; and continuing to control movement of the third virtual object according to the first recorded trajectory information after the free performance state ends.

7. The method according to claim 6, wherein the first recorded trajectory information comprises: n position points of the first virtual object, n being an integer greater than 1; and the continuing to control movement of the third virtual object according to the first recorded trajectory information comprises:

controlling the third virtual object to move from a position point at which the free performance state ends to a target position point in the n position points, the target position point being a position point that is in position points through which the third virtual object does not pass and is closest to the position point at which the free performance state ends; and controlling the third virtual object to start to continue to move from the target position point.

8. The method according to claim 7, wherein the controlling the third virtual object to move from a position point at which the free performance state ends to a target position point in the n position points comprises:

obtaining an angle between the third virtual object and the target position point and an orientation of the third virtual object; and controlling the third virtual object according to the orientation and the angle to move to the target position point;

or, obtaining a current state of the third virtual object; and controlling the third virtual object according to the current state and by using a behavior tree to move to the target position point.

9. The method according to claim 1, further comprising:

detecting whether a position relationship between the second virtual object and the third virtual object satisfies a first preset condition;

obtaining second recorded trajectory information when the position relationship satisfies the first preset condition, the second recorded trajectory information being another piece of recorded trajectory information different from the first recorded trajectory information; and controlling movement of the third virtual object according to the second recorded trajectory information in the racing battle.

10. The method according to claim 9, wherein the obtaining second recorded trajectory information comprises:

selecting, when a position of the second virtual object is ahead of a position of the third virtual object and a leading distance is greater than a first threshold, the second recorded trajectory information from other pieces of recorded trajectory information whose scores are higher than that of the first recorded trajectory information; and selecting, when the position of the second virtual object falls behind the position of the third virtual object and a falling-behind distance is greater than a second threshold, the second recorded trajectory information from other pieces of recorded trajectory information whose scores are lower than that of the first recorded trajectory information.

11. The method according to claim 1, further comprising:

recording trajectory information of the second virtual object in the racing battle;

detecting whether the trajectory information of the second virtual object satisfies a second preset condition; and uploading the trajectory information of the second virtual object to the server when the trajectory information of the second virtual object satisfies the second preset condition.

12. The method according to claim 11, wherein the second preset condition comprises at least one of the following: a distance by which the second virtual object moves backward is less than or equal to a distance threshold, a duration for which the second virtual object stays in place is less than or equal to a first time threshold, and an idle time of the second user account is less than or equal to a second time threshold.

13. A terminal, comprising a processor and a memory, the memory storing at least one instruction, the at least one instruction being loaded and executed by the processor to perform a plurality of operations including:

obtaining first recorded trajectory information, the first recorded trajectory information being information that is recorded when a first user account of an online gaming application controls a first virtual object to race in a virtual scene of the virtual environment and is used for drawing a movement trajectory of the first virtual object in the virtual scene of the virtual environment;

displaying a racing battle interface, the racing battle interface being used for presenting a racing battle comprising a second virtual object and a third virtual object, the second virtual object being a virtual object controlled by a second user account of the online gaming application, the third virtual object being a virtual object controlled by a computer; and controlling movement of the third virtual object according to the first recorded trajectory information in the racing battle, further including:

generating a fourth virtual object in the racing battle, the fourth virtual object being invisible in the racing battle interface;

controlling the fourth virtual object to move based on the first recorded trajectory information; and controlling the third virtual object to follow the fourth virtual object, the third virtual object being visible in the racing battle interface.

14. The terminal according to claim 13, wherein the first recorded trajectory information comprises: n position points of the first virtual object, n being an integer greater than 1; and
the controlling movement of the third virtual object according to the first recorded trajectory information comprises:
controlling the fourth virtual object to move according to the n position points under the drive of a power model;
determining a movement trajectory of the third virtual object according to a movement trajectory of the fourth virtual object; and
controlling the third virtual object to move according to the movement trajectory of the third virtual object.

15. The terminal according to claim 13, wherein the obtaining first recorded trajectory information comprises:
obtaining a capability value of the second user account;
transmitting an information obtaining request to a server, the information obtaining request comprising the capability value of the second user account;
receiving at least one piece of recorded trajectory information that is transmitted by the server and matches the capability value of the second user account; and
selecting the first recorded trajectory information from the at least one piece of recorded trajectory information.

16. The terminal according to claim 13, wherein the plurality of operations further comprise:
controlling, in the racing battle when the third virtual object has an abnormal condition, the third virtual object to enter a free performance state according to the abnormal condition; and
continuing to control movement of the third virtual object according to the first recorded trajectory information after the free performance state ends.

17. The terminal according to claim 13, wherein the plurality of operations further comprise:
detecting whether a position relationship between the second virtual object and the third virtual object satisfies a first preset condition;
obtaining second recorded trajectory information when the position relationship satisfies the first preset condition, the second recorded trajectory information being another piece of recorded trajectory information different from the first recorded trajectory information; and
controlling movement of the third virtual object according to the second recorded trajectory information in the racing battle.

18. The terminal according to claim 13, wherein the plurality of operations further comprise:
recording trajectory information of the second virtual object in the racing battle;
detecting whether the trajectory information of the second virtual object satisfies a second preset condition; and
uploading the trajectory information of the second virtual object to the server when the trajectory information of the second virtual object satisfies the second preset condition.

19. A non-transitory computer-readable storage medium, storing at least one instruction, the at least one instruction being loaded and executed by a processor of a terminal to perform a plurality of operations including:
obtaining first recorded trajectory information, the first recorded trajectory information being information that is recorded when a first user account of an online gaming application controls a first virtual object to race in a virtual scene of the virtual environment and is used for drawing a movement trajectory of the first virtual object in the virtual scene of the virtual environment;
displaying a racing battle interface, the racing battle interface being used for presenting a racing battle comprising a second virtual object and a third virtual object, the second virtual object being a virtual object controlled by a second user account of the online gaming application, the third virtual object being a virtual object controlled by a computer; and
controlling movement of the third virtual object according to the first recorded trajectory information in the racing battle, further including:
generating a fourth virtual object in the racing battle, the fourth virtual object being invisible in the racing battle interface;
controlling the fourth virtual object to move based on the first recorded trajectory information; and
controlling the third virtual object to follow the fourth virtual object, the third virtual object being visible in the racing battle interface.

20. The non-transitory computer-readable storage medium according to claim 19, wherein the first recorded trajectory information comprises: n position points of the first virtual object, n being an integer greater than 1; and
the controlling movement of the third virtual object according to the first recorded trajectory information comprises:
controlling the fourth virtual object to move according to the n position points under the drive of a power model;
determining a movement trajectory of the third virtual object according to a movement trajectory of the fourth virtual object; and
controlling the third virtual object to move according to the movement trajectory of the third virtual object.

* * * * *